(12) United States Patent
Chakraborty et al.

(10) Patent No.: US 12,091,724 B2
(45) Date of Patent: *Sep. 17, 2024

(54) GALVANNEALED STEEL SHEET COATED WITH AN IRON AND NICKEL LAYER TOPPED BY A ZINC-BASED LAYER

(71) Applicant: ArcelorMittal, Luxembourg (LU)

(72) Inventors: Anirban Chakraborty, Saint John, IN (US); Hassan Ghassemi-Armaki, Schererville, IN (US)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,503

(22) Filed: Jan. 9, 2023

(65) Prior Publication Data

US 2023/0160033 A1 May 25, 2023

Related U.S. Application Data

(62) Division of application No. 16/754,589, filed as application No. PCT/IB2018/058158 on Oct. 19, 2018, now Pat. No. 11,578,378.

(30) Foreign Application Priority Data

Oct. 24, 2017 (WO) .................. PCT/IB2017/001279

(51) Int. Cl.
*C21D 9/46* (2006.01)
*B23K 11/11* (2006.01)
(Continued)

(52) U.S. Cl.
CPC ................ *C21D 9/46* (2013.01); *B23K 11/11* (2013.01); *C21D 8/0273* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/32* (2013.01); *C23C 2/02* (2013.01); *C23C 2/022* (2022.08);
(Continued)

(58) Field of Classification Search
None
See application file for complete search history.

(56) References Cited

U.S. PATENT DOCUMENTS 4,569,731 A 2/1986 Matsuda et al.
5,441,628 A 8/1995 Tasaki et al.
(Continued)

FOREIGN PATENT DOCUMENTS

EP 2143816 1/2010
EP 2631319 8/2013
(Continued)

OTHER PUBLICATIONS

International Search Report of PCT/IB2018/058991, Feb. 15, 2019.
(Continued)

*Primary Examiner* — Jenny R Wu
(74) *Attorney, Agent, or Firm* — Davidson Kappel LLC

(57) ABSTRACT

Galvannealed steel sheet having a steel substrate coated with a first alloy layer with iron and nickel directly topped by a second alloy layer based on zinc, the first and second alloyed layers being alloyed through diffusion such that the second alloy layer includes from 5 to 15 wt. % of iron, from 0 to 15 wt. % of nickel, a balance being zinc.

19 Claims, 1 Drawing Sheet

(51) Int. Cl.

| | |
|---|---|
| *C21D 8/02* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/32* | (2006.01) |
| *C23C 2/02* | (2006.01) |
| *C23C 2/06* | (2006.01) |
| *C23C 2/28* | (2006.01) |
| *C23C 2/40* | (2006.01) |
| *C23C 28/02* | (2006.01) |
| *B23K 103/04* | (2006.01) |
| *B23K 103/20* | (2006.01) |

(52) U.S. Cl.
CPC .............. *C23C 2/0224* (2022.08); *C23C 2/06* (2013.01); *C23C 2/28* (2013.01); *C23C 2/40* (2013.01); *C23C 28/025* (2013.01); *C23C 28/027* (2013.01); *B23K 2103/04* (2018.08); *B23K 2103/20* (2018.08); *C21D 2211/001* (2013.01); *C21D 2211/002* (2013.01); *C21D 2211/003* (2013.01); *C21D 2211/005* (2013.01); *C21D 2211/008* (2013.01); *C21D 2211/009* (2013.01)

(56) References Cited

U.S. PATENT DOCUMENTS

| | | | |
|---|---|---|---|
| 10,023,931 B2 | 7/2018 | Haji et al. | |
| 2012/0009437 A1 | 1/2012 | Tran et al. | |
| 2012/0100391 A1 | 4/2012 | Lee et al. | |
| 2014/0234658 A1* | 8/2014 | Nozaki | C22C 38/12 |
| | | | 148/522 |
| 2014/0241933 A1 | 8/2014 | Haga et al. | |
| 2014/0349133 A1 | 11/2014 | Lee et al. | |
| 2014/0370330 A1 | 12/2014 | Sato et al. | |
| 2015/0284819 A1 | 10/2015 | Tamaki et al. | |
| 2016/0082701 A1 | 3/2016 | Kurosaki | |
| 2016/0145704 A1 | 5/2016 | Kawasaki et al. | |
| 2016/0208355 A1 | 7/2016 | Nakagaito et al. | |
| 2017/0073792 A1 | 3/2017 | Hidika et al. | |
| 2018/0371570 A1 | 12/2018 | Kim et al. | |
| 2020/0277693 A1 | 9/2020 | Chakraborty et al. | |
| 2020/0283868 A1 | 9/2020 | Chakraborty et al. | |
| 2020/0340124 A1 | 10/2020 | Bertho et al. | |
| 2020/0399774 A1 | 12/2020 | Chakraborty et al. | |

FOREIGN PATENT DOCUMENTS

| | | | |
|---|---|---|---|
| EP | 3088557 | | 11/2016 |
| JP | S589965 | | 1/1983 |
| JP | 61044168 | A | 3/1986 |
| JP | H07013286 | B2 | 2/1995 |
| JP | 2 561331 | B2 | 12/1996 |
| JP | 2000256789 | A | 9/2000 |
| JP | 2004124187 | A * | 4/2004 |
| JP | 2008144264 | A | 6/2008 |
| KR | 20120074144 | A | 7/2012 |
| KR | 20120074145 | A | 7/2012 |
| RU | 2402627 | C2 | 10/2010 |
| WO | WO 2014124749 | | 8/2014 |
| WO | WO2017105064 | A1 | 6/2017 |
| WO | WO2019082036 | A1 | 5/2019 |

OTHER PUBLICATIONS

See International Search Report of PCT/IB2018/058158, dated Feb. 14, 2019.
See International Search Report of PCT/IB2018/058155, dated Dec. 21, 2018.
See International Search Report of PCT/IB2018/058154, dated Dec. 3, 2018.

* cited by examiner

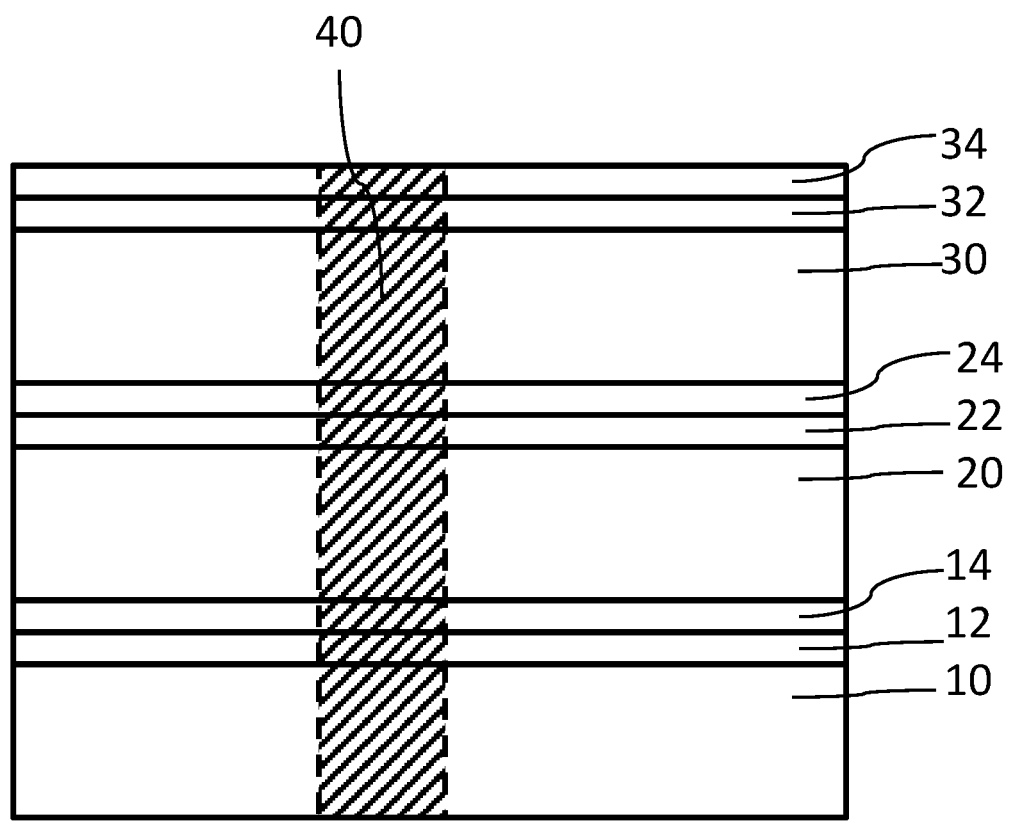

GALVANNEALED STEEL SHEET COATED WITH AN IRON AND NICKEL LAYER TOPPED BY A ZINC-BASED LAYER

This is a Divisional of U.S. patent application Ser. No. 16/754,589, filed on Apr. 8, 2020, now published as U.S. 2020/0283868 A1, which is a National Phase of PCT/IB2018/058158, filed on Oct. 19, 2018 which claims the benefit of International Patent Application PCT/IB2017/001279, filed on Oct. 24, 2017. All of the above are hereby incorporated by reference herein.

The present invention relates to a galvannealed steel sheet. The invention is particularly well suited for the manufacture of automotive vehicles.

BACKGROUND

Zinc based coatings are generally used because they allow for a protection against corrosion, thanks to barrier protection and cathodic protection. The barrier effect is obtained by the application of a metallic coating on steel surface. Thus, the metallic coating prevents the contact between steel and corrosive atmosphere. The barrier effect is independent from the nature of the coating and the substrate. On the contrary, sacrificial cathodic protection is based on the fact that zinc is a metal less noble that steel. Thus, if corrosion occurs, zinc is consumed preferentially as compared to steel. Cathodic protection is essential in areas where steel is directly exposed to corrosive atmosphere, like cut edges where surrounding zinc will be consumed before steel.

However, when heating steps are performed on such zinc coated steel sheets, for example hot press hardening or welding, cracks are observed in steel which spread from the steel/coating interface. Indeed, occasionally, there is a reduction of metal mechanical properties due to the presence of cracks in the coated steel sheet after the above operation. These cracks appear with the following conditions: high temperature; contact with a liquid metal having a low melting point (such as zinc) in addition to the presence of tensile stress; heterogeneous diffusion of molten metal with substrate grain and grain boundaries. The designation for such phenomenon is known as liquid metal embrittlement (LME), also called liquid metal assisted cracking (LMAC).

Sometimes, zinc coated steel sheets are alloyed at high temperature in order to obtain a galvannealed steel sheet. This steel sheet is more resistance to LME than a zinc coated steel sheet because an alloy comprising Fe and Zn is formed which has higher melting point and forms less liquid during spot welding as compared to pure Zinc.

However, although galvannealed steel sheets are more resistance to LME, when heating steps are performed, some cracks can appear because the resistance to LME is not sufficient enough.

SUMMARY OF THE INVENTION

It is an object of the present invention to provide a galvannealed steel sheet which does not have LME issues. It aims to make available, in particular, an easy to implement method in order to obtain an assembly which does not have LME issues after the forming and/or the welding.

The present invention provides a method for the manufacture of a galvannealed steel sheet comprising the following steps:

A. the provision of a pre-coated steel sheet coated with a first coating comprising iron and nickel, such steel sheet having the following chemical composition in weight percent:
  $0.10 < C < 0.40\%$,
  $1.5 < Mn < 3.0\%$,
  $0.7 < Si < 2.0\%$,
  $0.05 < Al < 1.0\%$
  $0.75 < (Si+Al) < 3.0\%$
  and on a purely optional basis, one or more elements such as
  $Nb \leq 0.5\%$,
  $B \leq 0.005\%$,
  $Cr \leq 1.0\%$,
  $Mo \leq 0.50\%$,
  $Ni \leq 1.0\%$,
  $Ti \leq 0.5\%$,
  the remainder of the composition making up of iron and inevitable impurities resulting from the elaboration, B. the thermal treatment of such pre-coated steel sheet at a temperature between 600 to 1000° C., C. the hot-dip coating of the steel sheet obtained in step B) with a second coating based on zinc and D. an alloying treatment to form a galvannealed steel sheet.

The present invention also provides a method to obtain a galvannealed steel sheet with a first layer comprising iron and nickel directly topped by a second layer based on zinc, the first and second layers being alloyed through diffusion such that the second alloy layer comprising from 5 to 15 wt. % of iron, from 0 to 15 wt. % and preferably from 1 to 15 wt. % of nickel, the balance being zinc.

The present invention also provides a spot welded joint of at least two metal sheets, comprising the coated steel sheet according to the present invention, said joint containing less than 3 cracks having a size above 100 μm and wherein the longest crack has a length below 400 μm.

The present invention also provides a galvannealed steel sheet or a spot welded joint as above that can be used for the manufacture of parts for automotive vehicle.

Other characteristics and advantages of the invention will become apparent from the following detailed description of the invention.

BRIEF DESCRIPTION OF THE DRAWING

FIG. 1 shows schematically a non-limiting example of a spot welded joint with three steel sheets made according to the present invention.

DETAILED DESCRIPTION

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 980 MPa, advantageously above or equal to 1180 MPa and even above or equal 1470 MPa.

The invention relates to a method for the manufacture of a galvannealed steel sheet comprising the following steps:

A. the provision of a pre-coated steel sheet coated with a first coating comprising iron and nickel, such steel sheet having the following chemical composition in weight percent:
  $0.10 < C < 0.40\%$,
  $1.5 < Mn < 3.0\%$,
  $0.7 < Si < 2.0\%$,
  $0.05 < Al < 1.0\%$
  $0.75 < (Si+Al) < 3.0\%$ and on a purely optional basis, one or more elements such as
Nb≤0.5%,
B≤0.005%,
Cr≤1.0%,
Mo≤0.50%,
Ni≤1.0%,
Ti≤0.5%,
the remainder of the composition making up of iron and inevitable impurities resulting from the elaboration,
B. the thermal treatment of such pre-coated steel sheet at a temperature between 600 to 1000° C.,
C. the hot-dip coating of the steel sheet obtained in step B) with a second coating based on zinc and
D. an alloying treatment to form a galvannealed steel sheet.

Without willing to be bound by any theory, it seems that during the thermal treatment, on the one hand, Ni diffuses towards the steel sheet allowing a Fe—Ni alloy layer. On the other hand, some amount of Ni is still present at the interface between the steel and the coating interface which preventing liquid zinc penetration into steel during any heating steps being for example a welding. Moreover, the presence of iron in the first coating allows for the formation of the Fe—Zn alloy during step D).

The first coating comprising iron and nickel is deposited by any deposition method known by the man skilled in the art. It can be deposited by vacuum deposition or electro-plating method. Preferably, it is deposited by electro-plating method.

Preferably, in step A), the first coating comprises from 10% to 75%, more preferably between 25 to 65% and advantageously between 40 to 60% by weight of iron.

Preferably, in step A), the first coating comprises from 25.0 to 90%, preferably from 35 to 75% and advantageously from 40 to 60% by weight of nickel.

In a preferred embodiment, in step A), the first coating consists of iron and nickel.

Preferably, in step A), the first coating has a thickness equal or above 0.5 µm. More preferably, the first coating has a thickness between 0.8 and 5.0 µm and advantageously between 1.0 and 2.0 µm.

Preferably, in step B), the thermal treatment is a continuous annealing. For example, the continuous annealing comprises a heating, a soaking and a cooling step. It can further comprise a pre-heating step.

Advantageously, the thermal treatment is performed in an atmosphere comprising from 1 to 30% of $H_2$ at a dew point between −10 and −60° C. For example, the atmosphere comprises from 1 to 10% of $H_2$ at a dew point between −40° C. and −60° C.

Advantageously, in step C), the second layer comprises above 70%, more preferably above 80% of zinc and advantageously above 85% of zinc. The second layer can be deposited by any deposition method known by the man skilled in the art. It can be done by hot-dip coating, by vacuum deposition or by electro-galvanizing.

For example, the coating based on zinc comprises between 0.01 and 0.18 wt. % Al, optionally 0.2-8.0% Mg, the remainder being Zn.

Preferably, the coating based on zinc is deposited by hot-dip galvanizing method. In this embodiment, the molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

In a preferred embodiment, the second layer consists of zinc. In this case, when the coating is deposited by hot-dip galvanizing, the percentage of Aluminum is comprised between 0.10 and 0.18 wt. % in the bath.

Preferably, in step D), the alloying treatment is performed by heating the coated steel sheet obtained in step C) at a temperature between 460 and 550° C. for 5 to 40 seconds. For example, step D is performed at 500° C. for 20 seconds.

With the method according to the present invention, a galvannealed steel sheet is obtained with a first layer comprising iron and nickel directly topped by a second layer based on zinc, the first and second layers being alloyed through diffusion such that the second alloy layer comprising from 5 to 15 wt. % of iron, from 0 to 15 wt. % and preferably from 1 to 15 wt. % of nickel, the balance being zinc.

Preferably, the steel sheet has a microstructure comprising from 1 to 50% of residual austenite, from 1 to 60% of martensite and optionally at least one element chosen from: bainite, ferrite, cementite and pearlite. In this case, the martensite can be tempered or untempered.

In a preferred embodiment, the steel sheet has a microstructure comprising from 5 to 25% of residual austenite.

Preferably, the steel sheet has a microstructure comprising from 1 to 60% and more preferably between 10 to 60% of tempered martensite.

Advantageously, the steel sheet has a microstructure comprising from 10 to 40% of bainite, such bainite comprising from 10 to 20% of lower bainite, from 0 to 15% of upper bainite and from 0 to 5% of carbide free bainite.

Preferably, the steel sheet has a microstructure comprising from 1 to 25% of ferrite.

Preferably, the steel sheet has a microstructure comprising from 1 to 15% untempered martensite.

After the manufacture of a steel sheet, in order to produce some parts of a vehicle, it is known to assembly by welding two metal sheets. Thus, a spot welded joint is formed during the welding of at least two metal sheets, said spot being the link between the at least two metal sheets.

To produce a spot welded joint according to the invention, the welding is performed with an effective intensity is between 3 kA and 15 kA and the force applied on the electrodes is between 150 and 850 daN with said electrode active face diameter being between 4 and 10 mm.

Thus, a spot welded joint of at least two metal sheets, comprising the coated steel sheet according to the present invention, is obtained, such said joint containing less than 3 cracks having a size above 100 µm and wherein the longest crack has a length below 400 µm.

Preferably, the second metal sheet is a steel sheet or an aluminum sheet. More preferably, the second metal sheet is a steel sheet according to the present invention.

In another embodiment, the spot welded joint comprises a third metal sheet being a steel sheet or an aluminum sheet. For example, the third metal sheet is a steel sheet according to the present invention. FIG. 1 thus shows schematically a spot weld 40 for joining three metal sheets each with a steel substrate 10, 20, 30, first coating 12, 22, 32 and second coating 14, 24, 34, respectively.

The steel sheet or the spot welded joint according to the present invention can be used for the manufacture of parts for automotive vehicle.

The invention will now be explained in trials carried out for information only. They are not limiting.

Example

For all samples, steel sheets used have the following composition in weight percent: C=0.37 wt. %, Mn=1.9 wt. %, Si=1.9 wt. %, Cr=0.35 wt. %, Al=0.05 wt. % and Mo=0.1%.

Trial 1 to 4 were prepared by deposited a first coating comprising 55% and 75% of Ni, the balance being Fe. Then, a continuous annealing was performed in an atmosphere comprising 5% of $H_2$ and 95% of $N_2$ at a dew point of −45° C. The pre-coated steel sheet was heated at a temperature of 900° C. A zinc coating was deposited by hot-dip galvanizing, the zinc bath comprising 0.2% of Al. The bath temperature was of 460° C. Finally, an alloying treatment was performed at 500° C. for 20 seconds in order to obtain a galvannealed steel sheet.

For comparison purpose, Trial 5 was prepared by depositing a zinc coating by electro-galvanizing after the continuous annealing of the above steel sheet.

The resistance to LME of Trials 1 to 5 was evaluated. To this end, for each Trial, two coated steel sheets were welded together by resistance spot welding. The type of the electrode was ISO Type B with a diameter of 16 mm; the force of the electrode was of 5 kN and the flow rate of water of was 1.5 g/min. The welding cycle was cycle is reported in Table 1.

TABLE 1

| Welding Schedule | | | | |
|---|---|---|---|---|
| Weld time | Pulses | Pulse (cy) | Cool time (cy) | Hold time (cy) |
| Cycle | 2 | 12 | 2 | 10 |

The number of cracks above 100 µm was then evaluated using an optical as well as SEM (Scanning Electron Microscopy) as reported in Table 2.

TABLE 2

| LME crack details after spot welding (2 layer stack-up condition) | | | | | |
|---|---|---|---|---|---|
| Trials | 1st coating | Thickness (µm) | 2nd coating | Thickness (µm) | Number of cracks (>100 µm) per spot weld | Maximum crack length (µm) |
| Trial 1* | Fe-(55%)Ni | 1 | Zn (GA) | 7 | 0 | 0 |
| Trial 2* | Fe-(55%)Ni | 2 | Zn (GA) | 7 | 0 | 250 |
| Trial 3* | Fe-(75%)Ni | 1 | Zn (GA) | 7 | 0 | 250 |
| Trial 4* | Fe-(75%)Ni | 2 | Zn (GA) | 7 | 0 | 0 |
| Trial 5 | — | — | Zn (EG) | 7 | 3 | 760 |

*according to the present invention.

Trials according to the present invention show an excellent resistance to LME compared to Trial 5. Indeed, the number of cracks of Trials according to the present invention is very low, even nonexistent, compared to Trial 5.

For each Trial, three coated steel sheets were also welded together by resistance spot welding under three layer stack-up configuration. The number of cracks above 100 µm was then evaluated using an optical as well as SEM (Scanning Electron Microscopy) as reported in Table 3.

TABLE 3

| LME crack details after spot welding (3 layer stack-up condition) | | |
|---|---|---|
| Trials | Number of cracks (>100 µm) per spot weld | Maximum crack length (µm) |
| Trial 1* | 1 | 250 |
| Trial 2* | 2 | 350 |
| Trial 3* | 1 | 150 |
| Trial 4* | 1 | 250 |
| Trial 5 | 7 | 850 |

*according to the present invention.

Trials according to the present invention show an excellent resistance to LME as compared to Trial 5.

Finally, Trials 1 to 4 were bent at a 90° angle followed. An adhesive tape was then applied and removed to verify the coating adhesion with the substrate steel. The coating adhesion of those Trials was excellent.

What is claimed is:

1. A galvannealed steel sheet obtainable from a method comprising the steps of providing a pre-coated steel sheet coated with a first coating consisting of iron and from 25% to 90%, by weight, nickel, such steel sheet having the following composition in weight percent:
0.10<C<0.40%,
1.5<Mn<3.0%,
0.7<Si<2.0%,
0.05<Al<1.0%
0.75<(Si+Al)<3.0%
and on a purely optional basis, one or more elements
Nb≤0.5%,
B≤0.005%,
Cr<1.0%,
Mo≤0.50%,
Ni≤1.0%,
Ti≤0.5%,
a remainder of the composition making up of iron and inevitable impurities resulting from processing; thermally treating the pre-coated steel sheet at a temperature between 600 to 1000° C.; hot-dip coating of the steel sheet obtained by the thermally treating step with a second coating based on zinc; and providing an alloying treatment to form the galvannealed steel sheet, the galvannealed steel sheet comprising:
a steel substrate coated with a first alloy layer consisting of iron and nickel directly topped by a second alloy layer based on zinc, the first and second alloyed layers being alloyed through diffusion such that the second alloy layer includes from 5 to 15 wt. % of iron, from 1 to 15 wt. % of nickel, a balance being zinc.

2. The galvannealed steel sheet as recited in claim 1 wherein a microstructure of the steel substrate includes from 1 to 50% of residual austenite, from 1 to 60% of martensite and optionally at least one element chosen from: bainite, ferrite, cementite and pearlite.

3. The galvannealed steel sheet as recited in claim 2 wherein the microstructure includes from 5 to 25% of residual austenite.

4. The galvannealed steel sheet as recited in claim 2 wherein the microstructure includes from 1 to 60% of tempered martensite.

5. The galvannealed steel sheet as recited in claim 2 wherein the microstructure includes from 10 to 40% of bainite.

6. The galvannealed steel sheet as recited in claim 2 wherein the microstructure includes from 1 to 25% of ferrite.

7. The galvannealed steel sheet as recited in claim 2 wherein the microstructure includes from 1 to 15% of untempered martensite.

8. The galvannealed steel sheet as recited in claim 1 wherein the galvannealed steel sheet is obtained from the method and has a tensile strength above or equal to 500 MPa.

9. The galvannealed steel sheet as recited in claim 1 wherein the steel substrate has the composition of the steel sheet.

10. The galvannealed steel sheet as recited in claim 1 wherein an amount of Fe in the first coating is between 25 to 65%, by weight.

11. The galvannealed steel sheet as recited in claim 10 wherein the amount of Fe in the first coating is between 40 to 60%, by weight.

12. The galvannealed steel sheet as recited in claim 11 wherein the amount of Ni in the first coating is from 35 to 75%, by weight.

13. The galvannealed steel sheet as recited in claim 12 wherein the amount of Ni in the first coating is from 40 to 60%, by weight.

14. The galvannealed steel sheet as recited in claim 12 wherein the first coating has a thickness between 0.8 and 5.0 μm.

15. A spot welded joint comprising:

at least two metal sheets including a first metal sheet being the galvannealed steel sheet as recited in claim 1, the joint containing less than 3 cracks having a size above 100 μm and wherein the longest crack has a length below 400 μm.

16. The spot welded joint as recited in claim 15 wherein a second metal sheet of the metal sheets is a steel sheet or an aluminum sheet.

17. The spot welded joint as recited in claim 15 wherein a second metal sheet of the metal sheets is a galvannealed steel sheet including a second steel substrate coated with a further first alloy layer comprising iron and nickel directly topped by a further second alloy layer based on zinc, the further first and further second alloy layers being alloyed through diffusion such that the further second alloy layer includes from 5 to 15 wt. % of iron, from 0 to 15 wt. % of nickel, a balance being zinc.

18. The spot welded joint as recited in claim 15 wherein the at least two metals sheets include a third metal sheet being a steel sheet or an aluminum sheet.

19. An automotive vehicle part comprising the steel sheet as recited in claim 1.

* * * * *